United States Patent
Thomas et al.

(10) Patent No.: US 6,665,618 B1
(45) Date of Patent: Dec. 16, 2003

(54) SEISMIC SURVEY DESIGN TECHNIQUE

(75) Inventors: James W. Thomas, Bartlesville, OK (US); John M. Hufford, Bartlesville, OK (US); Warren H. Neff, Bartlesville, OK (US); Gary M. Hoover, Bartlesville, OK (US); Kay D. Wyatt, Bartlesville, OK (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 10/219,699

(22) Filed: Aug. 14, 2002

(51) Int. Cl.⁷ .................................................. G01V 1/00
(52) U.S. Cl. ............................................. 702/14; 702/16
(58) Field of Search ...................... 702/14, 16; 703/5; 367/56

(56) References Cited

U.S. PATENT DOCUMENTS

| | | |
|---|---|---|
| 4,534,019 A | 8/1985 | Wiggins et al. |
| 4,611,311 A * | 9/1986 | Frasier .................... 367/38 |
| 5,343,441 A | 8/1994 | Alford |
| 5,610,875 A | 3/1997 | Gaiser |
| 6,128,580 A * | 10/2000 | Thomsen .................... 702/18 |
| 6,161,070 A | 12/2000 | Jinno et al. |
| 6,311,132 B1 | 10/2001 | Rosenquist et al. |

OTHER PUBLICATIONS

"Converted Waves: Properties and 3–D Survey Design", Vemeer, 69$^{th}$ Annual Internat. Mtg., Soc. Expl. Geophys, 1999.*

"Converted Waves: Properties and 3–D Survey Design", Vermeer, 69$^{th}$ Annual Internat. Mtg., Soc. Expl. Geophys, 1999.*

"Creating Image Gathers in the Absence of Proper Common–Offset Gathers", Vermeer, ASEG Conference, Nov. 1998.*

* cited by examiner

*Primary Examiner*—John Barlow
*Assistant Examiner*—Toan M Le
(74) *Attorney, Agent, or Firm*—Kameron D. Kelly

(57) ABSTRACT

An improved system for designing seismic surveys wherein the density and areal size of the seismic survey components (e.g., sources or receivers) are selected based on a plurality of calculated templates of the components that are generated using a mapping function.

43 Claims, 8 Drawing Sheets

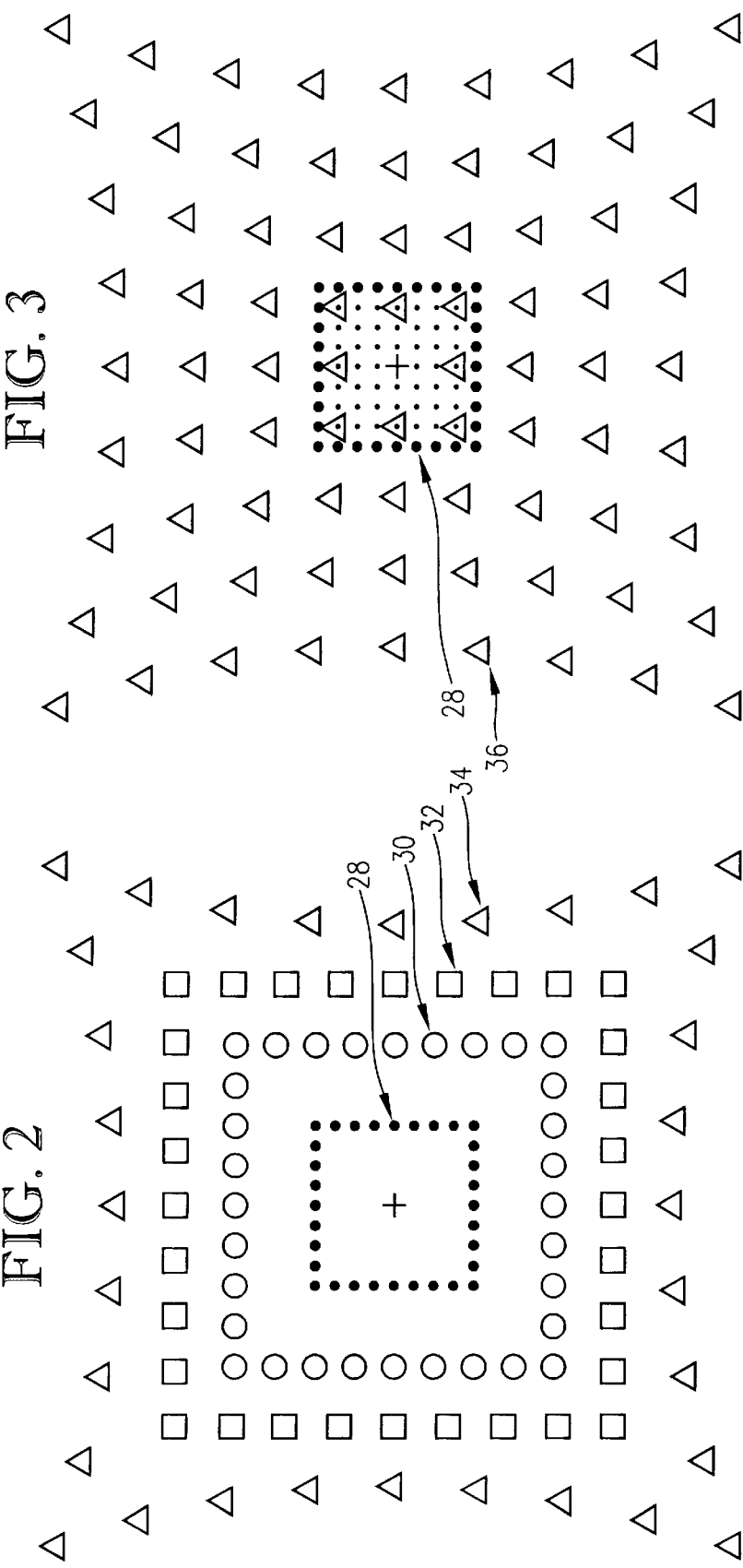

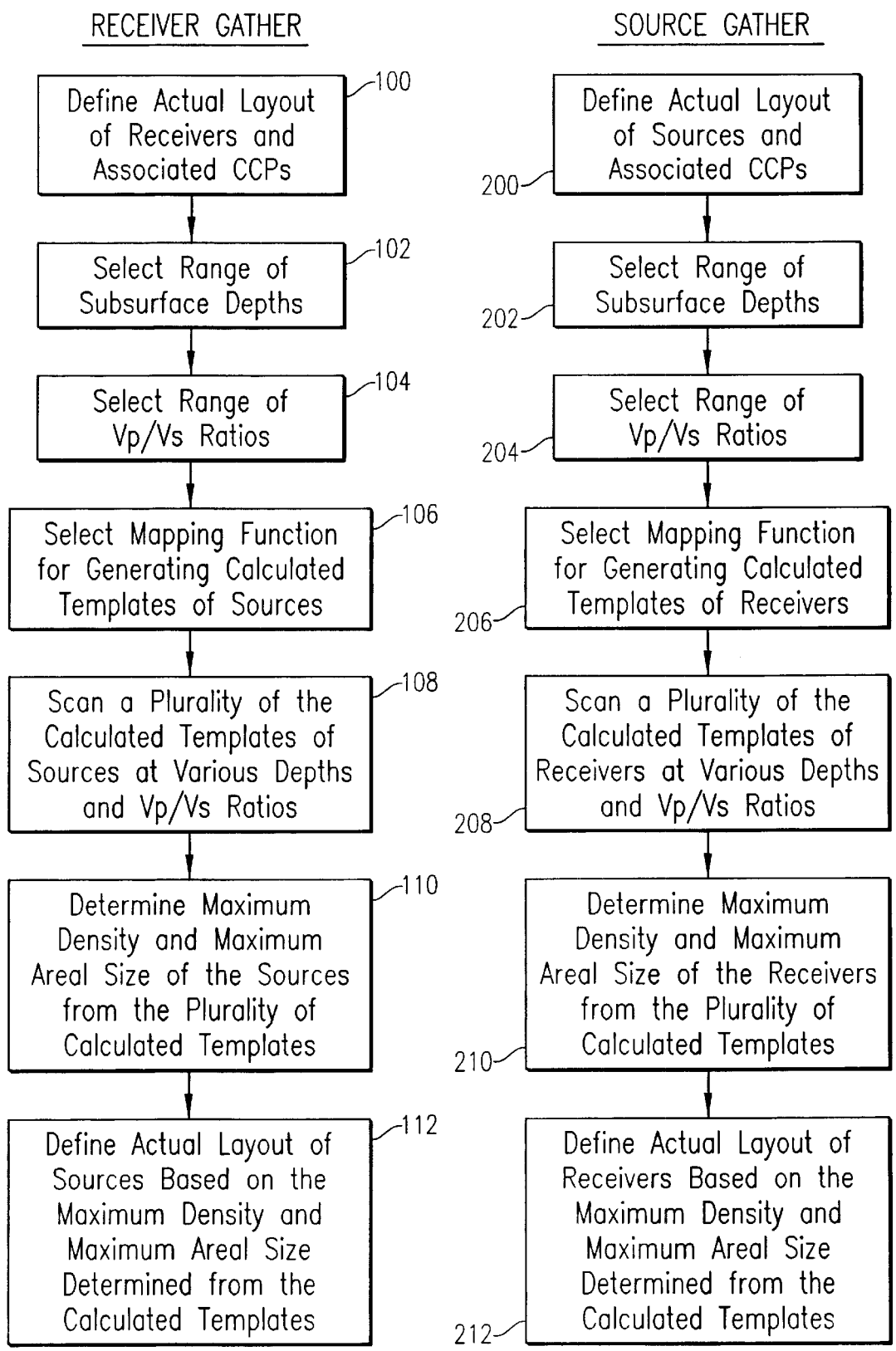

SEISMIC SURVEY DESIGN TECHNIQUE

BACKGROUND OF THE INVENTION

1. Field of the Invention

The present invention relates generally to geophysical exploration. In another aspect, the invention concerns a method for designing and conducting a 3-D seismic survey that records converted wave data.

2. Description of the Prior Art

Seismic surveying is a key technology area in geophysical prospecting. In a typical seismic survey, a source (e.g., vibroseis or explosive) on the surface of the earth generates a signal which propagates through the earth. The subsurface geological structures attenuate, reflect, and refract the signal. Receivers (e.g., geophones) on the earth's surface monitor the reflected wave. From the traces gathered by the receivers, seismologists construct a model of the earth's subsurface.

Over the years, increasingly sophisticated survey designs and data processing techniques have been developed. For example, until the early 1980s, most land seismic surveys were two-dimensional (2-D) surveys conducted along a single line of source and receiver points. Today, most surveys are three-dimensional (3-D) where sources and receivers are scattered along a plane and the geometry of the sources and receivers are defined by the requirements of the survey.

Seismic energy can propagate through the earth in one of two forms: compressional waves (P-waves) and shear waves (S-waves). P-waves have vector displacements parallel to the direction of propagation, whereas S-waves have vector displacements that are orthogonal to the direction of propagation. "Converted waves" travel first as one type of wave and then the other, with the conversion between wave types happening at seismic discontinuities. If the conversion is from an incident P-wave to a reflected S-wave at the reflecting geological structure, this reflection mode is called a C-wave. S-waves travel through the earth with a velocity dependent on the shear rigidity of the subsurface formation. Thus, S-waves contain different information about the subsurface structure than do P-waves.

Although all seismic surveys generate C-waves, ordinary techniques of seismic signal reception and processing are designed to suppress these C-waves in favor of P-wave arrivals. Nonetheless, there are many exploration and exploitation settings wherein one would wish to maximize, rather than suppress, C-wave arrivals (e.g., where the target cannot be readily imaged by P-waves). This might happen, for example, where the elastic contrasts of the subsurface rock layers yield only weak P-wave reflections; where salt bodies occur above the target; or, where subsurface "gas clouds" obscure the target, as might occur in connection with a hydrocarbon reservoir above which the over-burden contains a small concentration of gas. In this latter situation, the gas may severely delay and attenuate conventional P-waves traveling through the overburden, so that the underlying reservoir will be poorly imaged. However, a gas-filled rock does not unduly slow or attenuate S-waves, so one may be able to obtain better images of such reservoirs using C-wave techniques.

Conventional seismic processing relies heavily on a stack (or average) of seismic traces from a common midpoint (CMP) gathered to reduce noise in the seismic section, and as a tool for estimating subsurface velocities. The stacking approach is generally satisfactory for P-wave seismic data, but often fails when applied to C-wave data. One reason for this is that the travel paths of C-waves are asymmetrical, even for simple horizontally layered medium. Multiple coverage of the same subsurface point cannot be achieved for C-wave data by stacking a CMP together, but instead requires true common reflection point (CRP) sorting which, for C-wave reflections, is actually a common conversion point (CCP) gather.

Many studies have focused on methods for processing and interpreting seismic data to provide a better image of subsurface formations. However, much less attention has been given to enhancing the efficiency of seismic surveys by optimizing the geometric design (i.e., layout) of the seismic sources and receivers, while still maintaining the desired geophysical requirements of the survey. This is particularly true for 3-D C-wave surveys where the travel paths of C-waves are asymmetrical.

OBJECTS AND SUMMARY OF THE INVENTION

It is, therefore, an object of the present invention to provide a novel method of designing a seismic survey layout wherein the number of seismic survey components (i.e., seismic sources and receivers) is minimized, while still maintaining the desired geophysical requirements of fold, azimuth, and offset.

A further object of the present invention is to provide an improved method for conducting a 3-D C-wave seismic survey with minimal cost and optimum subsurface illumination.

It should be noted that the present invention need not accomplish all of the above-listed objects, and further objects and advantages of the invention will be apparent from the written description and drawings.

BRIEF DESCRIPTION OF THE DRAWING FIGURES

Preferred embodiments of the present invention are described in detail below with reference to the attached drawing figures, wherein:

FIG. 2 is a plan view representation showing the perimeter seismic sources of calculated source templates generated by the various mapping functions for the seismic receiver;

FIG. 3 is a plan view representation showing a full calculated source template generated by a third order C-wave mapping function;

FIG. 9 is a step diagram showing the steps involved in designing an optimum layout of seismic sources based on a given layout of seismic receivers and associated CCPs; and FIG. 10 is a step diagram showing the steps involved in designing an optimum layout of seismic receivers based on a given layout of seismic sources and associated CCPs.

DETAILED DESCRIPTION OF THE PREFERRED EMBODIMENT

Figure 1:
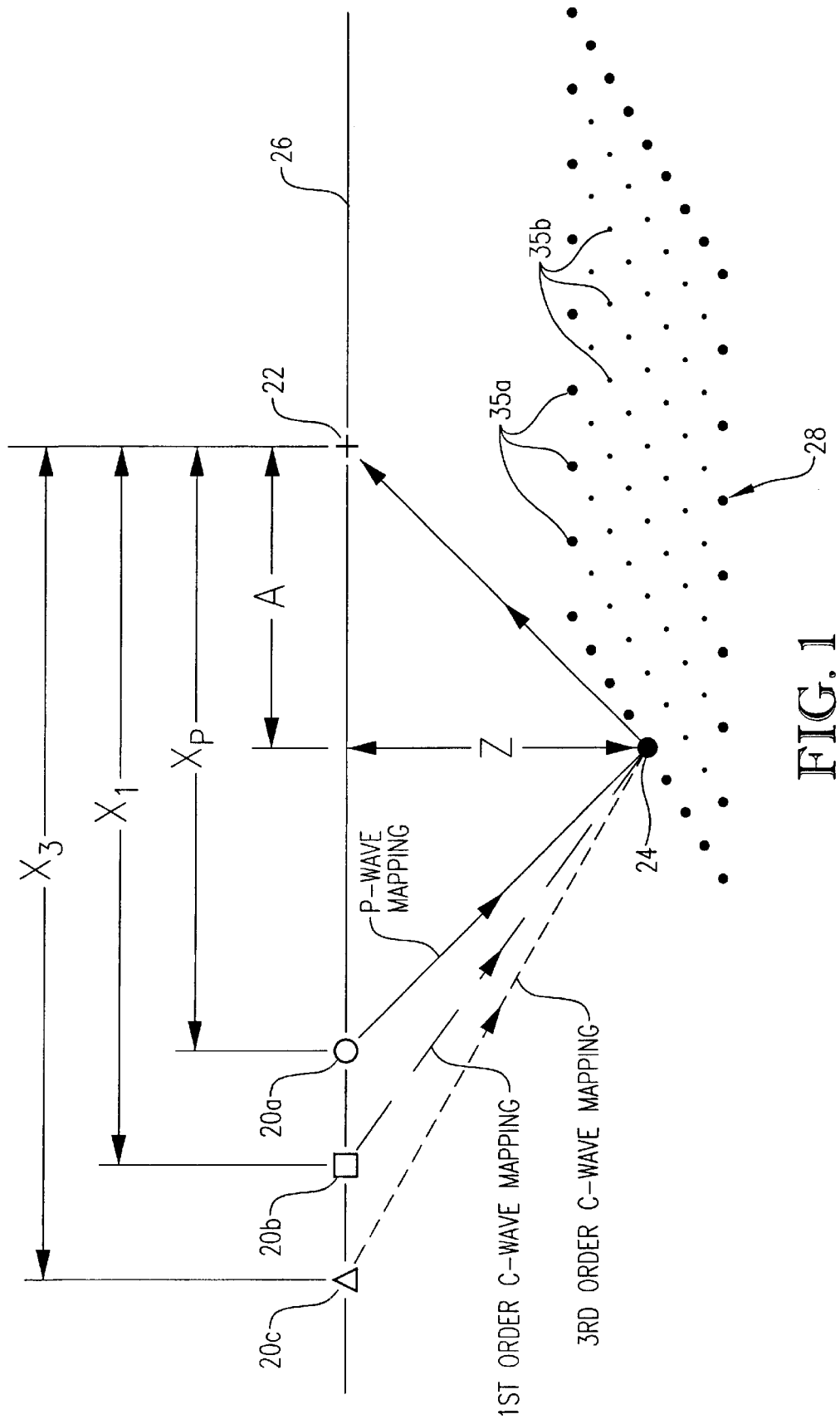
FIG. 1 is a side view representation showing the estimated travel paths of reflected seismic waves traveling from several seismic sources to a seismic receiver via a reflection point, with the travel path of the waves being estimated by various mapping functions.

Referring initially to FIG. 1, a theoretical one-to-one mapping between a seismic sources 20a,b,c (or "shot points") and a seismic receiver 22 for a given subsurface reflection point 24 can be defined using various mapping functions. For P-waves, the mapping function estimating the travel path of the wave is simple because the angle of incidence and the angle of reflection of a P-wave are the same. Thus, assuming that the subsurface formation presenting reflection point 24 is horizontally oriented and the surface 26 (e.g., ground surface or ocean bottom surface) on which seismic source 20a and seismic receiver 22 are positioned is horizontal, the calculated P-wave distance (Xp) between source 20a and receiver 22 can be determined from the following mapping function:

$$Xp=2A$$

wherein A is the horizontal distance (Xp) between seismic receiver 22 and reflection point 24.

For C-waves, any of several mapping functions may be used to estimate the travel path of the C-wave. A first order C-wave mapping function can be used to generate a calculated first order C-wave distance ($X_1$) between seismic source 20b and seismic receiver 22. The first order C-wave mapping function can be expressed as follows:

$$X_1=A(1+Vp/Vs)$$

wherein Vp is the velocity of a P-wave through the subsurface formation and Vs is the velocity of an S-wave through the subsurface formation. Thus, using a first order C-wave mapping function, the distance ($X_1$) between seismic source 20b and seismic receiver 22 varies with the Vp/Vs ratio.

A third order C-wave mapping function can also be used to generate a calculated third order C-wave distance ($X_3$) between seismic source 20c and seismic receiver 22. A third order C-wave mapping function is generally thought to be a more accurate estimation of a C-wave travel path than the first order C-wave mapping function. A third order C-wave mapping function can be expressed as follows:

$$X_3 = \frac{(1-C_0) - \sqrt{(1-C_0)^2 - (4*C_3*A^2/Z^2)}}{(2*A*C_3/Z^2)}$$

wherein g=Vp/Vs,
$C_0=g/(1+g)$,
$C_2=0.5*g(g-1)/((g+1)^3)$,
$C_3=C_2/(1-C_0)$, and
Z=depth of reflecting surface.

Thus, using a third order C-wave mapping function, the distance ($X_3$) between seismic source 20c and seismic receiver 22 varies with the depth (Z) of reflection point 24, as well as the Vp/Vs ratio.

In FIG. 1, reflection point 24 is illustrated as being just one reflection point in a substantially horizontal, planar, subsurface reflection point group 28 that is associated with seismic receiver 22. When P-wave mapping is employed, each reflection point of reflection point group 28 is referred to as a common midpoint (CMP), due to the fact that source 20a and receiver 22 are equidistant from reflection point 24. When C-wave mapping is employed, each reflection point of reflection point group 28 is referred to as a common conversion point (CCP). The design (i.e., spacing) of the CMPs or CCPs of reflection point group 28 is based primarily on the desired spatial resolution (i.e., bin size) of the subsurface illumination. The mapping functions, described above, are operable to generate a calculated template of surface seismic sources 20 for surface seismic receiver 22, with each source 20 of the calculated template corresponding to an individual subsurface reflection point (i.e., CMP or CCP) of reflection point group 28. Thus, the calculated template of seismic sources (or "shot points") 20 associated with seismic receiver 22 will have the same number of sources 20 as there are reflection points in reflection point group 28.

FIG. 2 illustrates first, second, and third perimeter source patterns 30, 32, 34 of the calculated source templates for seismic sources 20a,b,c and perimeter reflection points 35a of reflection point group 28. First perimeter source pattern 30 represents the calculated positions of seismic sources 20a associated with perimeter reflection points 35 using the P-wave mapping function. Second perimeter source pattern 32 represents the calculated positions of seismic sources 20b associated with perimeter reflection points 35 using the first order C-wave mapping function. Third perimeter source pattern 34 represents the calculated positions of seismic sources 20c associated with perimeter reflection points 35 using the third order C-wave mapping function. As can readily be seen from FIG. 2, the calculated source template for the P-wave and first order C-wave mapping functions comprise a generally rectangular grid of seismic sources 20a,b. However, the calculated template for the third order C-wave mapping function comprises a generally non-rectangular, hammock-shaped grid of seismic sources 20c. FIG. 3 more clearly illustrates a full calculated source template 36 of seismic sources 20c for seismic receiver 14 and associated reflection point group 28 using the third order C-wave mapping function to estimate the ideal locations of seismic sources 20c.

Figure 4:
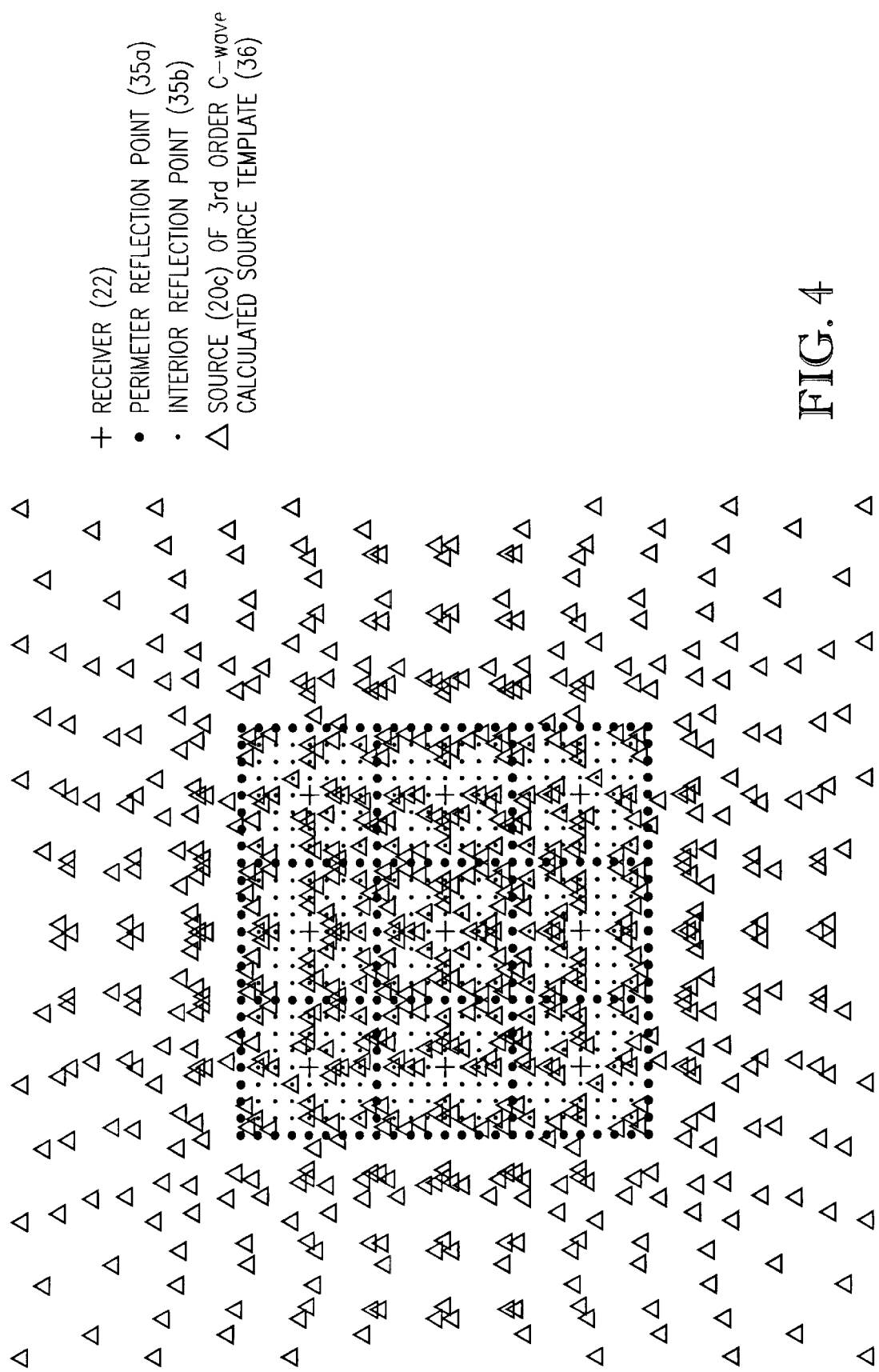
FIG. 4 is a plan view representation showing the overlapping calculated source templates for a plurality of receivers in a single fold configuration.

Referring now to FIG. 4, a typical 3-D seismic survey employs a plurality of seismic receivers 22 (represented as cross-hairs "+") in a receiver layout that is in the form of a generally rectangular grid of receivers 22. The spacing between seismic receivers 22 in the receiver layout depends largely on the desired fold of the subsurface illumination. FIG. 4 illustrates a single-fold layout of seismic receivers 22, the groups 28 of reflection points 35 (represented as solid dots "●") associated with each receiver 22, and the third order C-wave calculated source templates 36 of seismic sources 20c (represented as triangles "Δ") for each receiver 22. The layout of seismic receivers 22 illustrated in FIG. 4 represents a single-fold layout because there is no overlap of reflection points 35 associated with adjacent receivers 22. It can readily be seen from FIG. 4 that positioning and activating an actual seismic source (e.g., vibroseis, explosive, airgun, etc.) at each calculated source location would be difficult and economically unfeasible due to the crowded and irregular pattern of sources 20c of calculated source templates 36.

Figure 5:
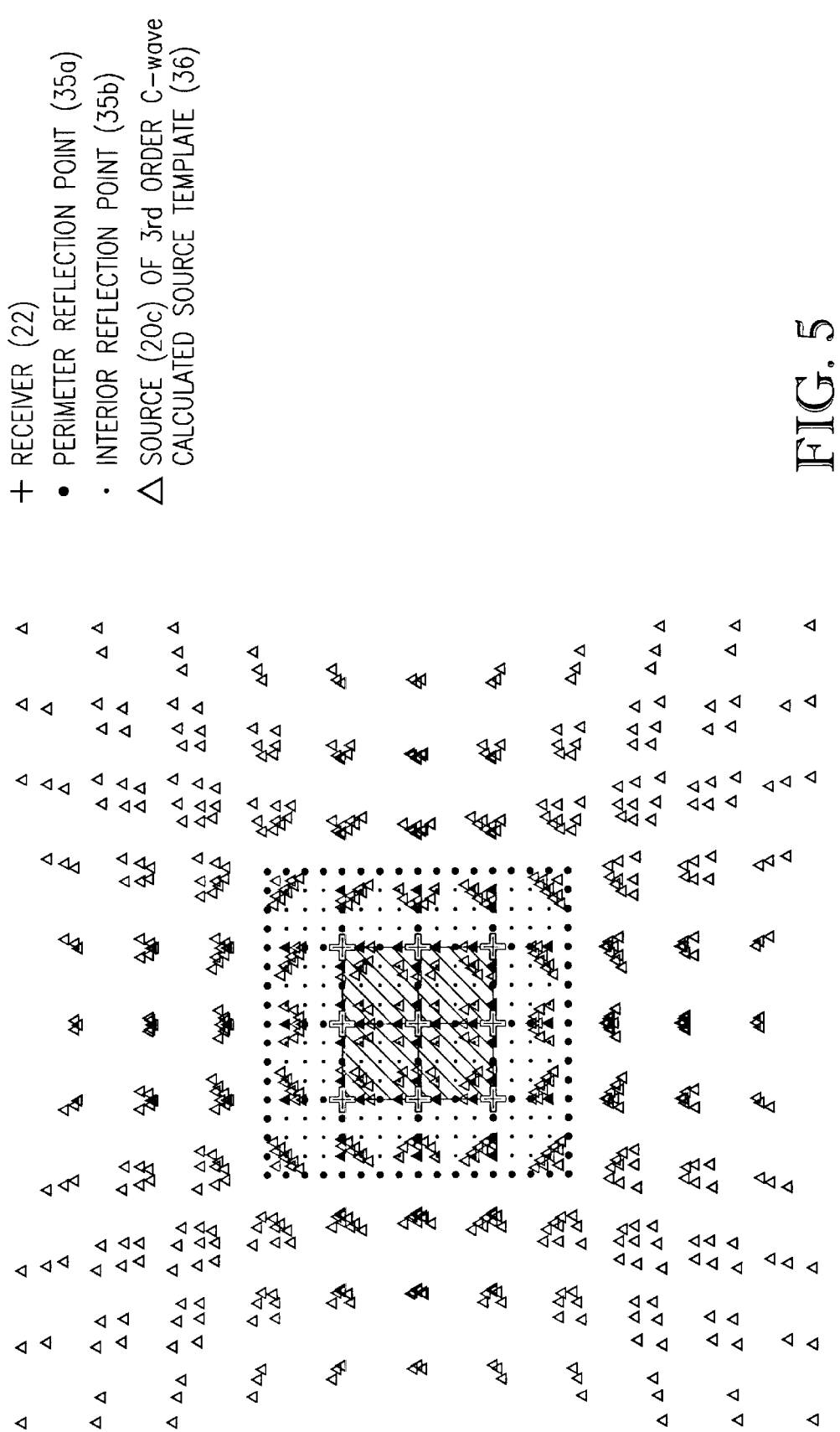
FIG. 5 is a plan view representation showing the overlapping calculated source templates for a plurality of receivers in a four-fold configuration.

FIG. 5 illustrates a four-fold layout of receivers 22, the reflection point groups 28 associated with each receiver 22, and the calculated source templates 36 of seismic sources 20c for each receiver 22. The four-fold nature of the layout of receivers 22 is caused by the four-fold overlap of reflection points 35 located in the quadrants surrounding the centrally located receiver 22. The four-fold subsurface illumination area is shown in FIG. 5 as the shaded area. While such a four-fold receiver layout may increase the quality of gathered seismic data, the corresponding calculated source template would be even more difficult and expensive to shoot than the single fold layout illustrated in FIG. 4 due to its density and irregular pattern of sources 20c.

Figure 6:
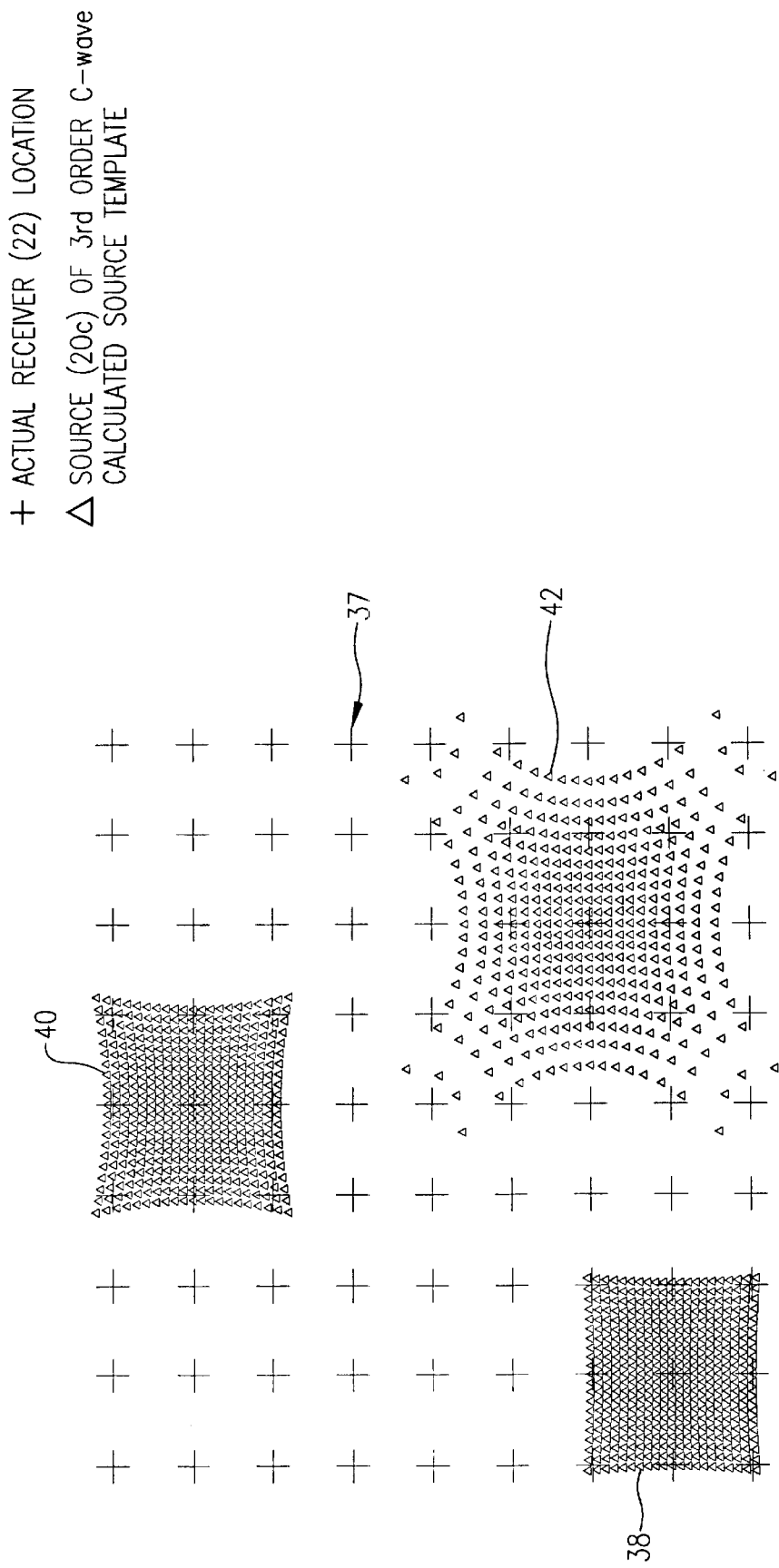
FIG. 6 is a plan view representation of an actual layout of seismic receivers, comparing the geometry of three different calculated source templates for three different receivers at various subsurface depths and Vp/Vs ratios.

Referring to FIG. 6, an actual receiver layout 37 of receivers 22 is illustrated along with first, second, and third unique calculated source templates 38, 40, 42. First, second, and third calculated source templates 38, 40, 42 provide a visual comparison of the manner in which the density and areal size of the calculated source templates vary with depth and Vp/Vs ratio. First calculated source template 38 represents a third order C-wave calculated template at a depth of 4,500 feet and a Vp/Vs ratio of 2.9. Second calculated source template 40 represents a third order C-wave calculated template at a depth of 3,000 feet and a Vp/Vs ratio of 2.9. Third calculated source template 42 represents a third order C-wave calculated template at a depth of 3,000 feet and a Vp/Vs ratio of 4.0. As illustrated in FIG. 6, the density of the sources in the third order C-wave calculated templates increases with an increase in depth and a decrease in Vp/Vs ratio while the areal size of the sources in the third order C-wave calculated templates increases with a decrease in depth and an increase in Vp/Vs ratio.

Figure 7:
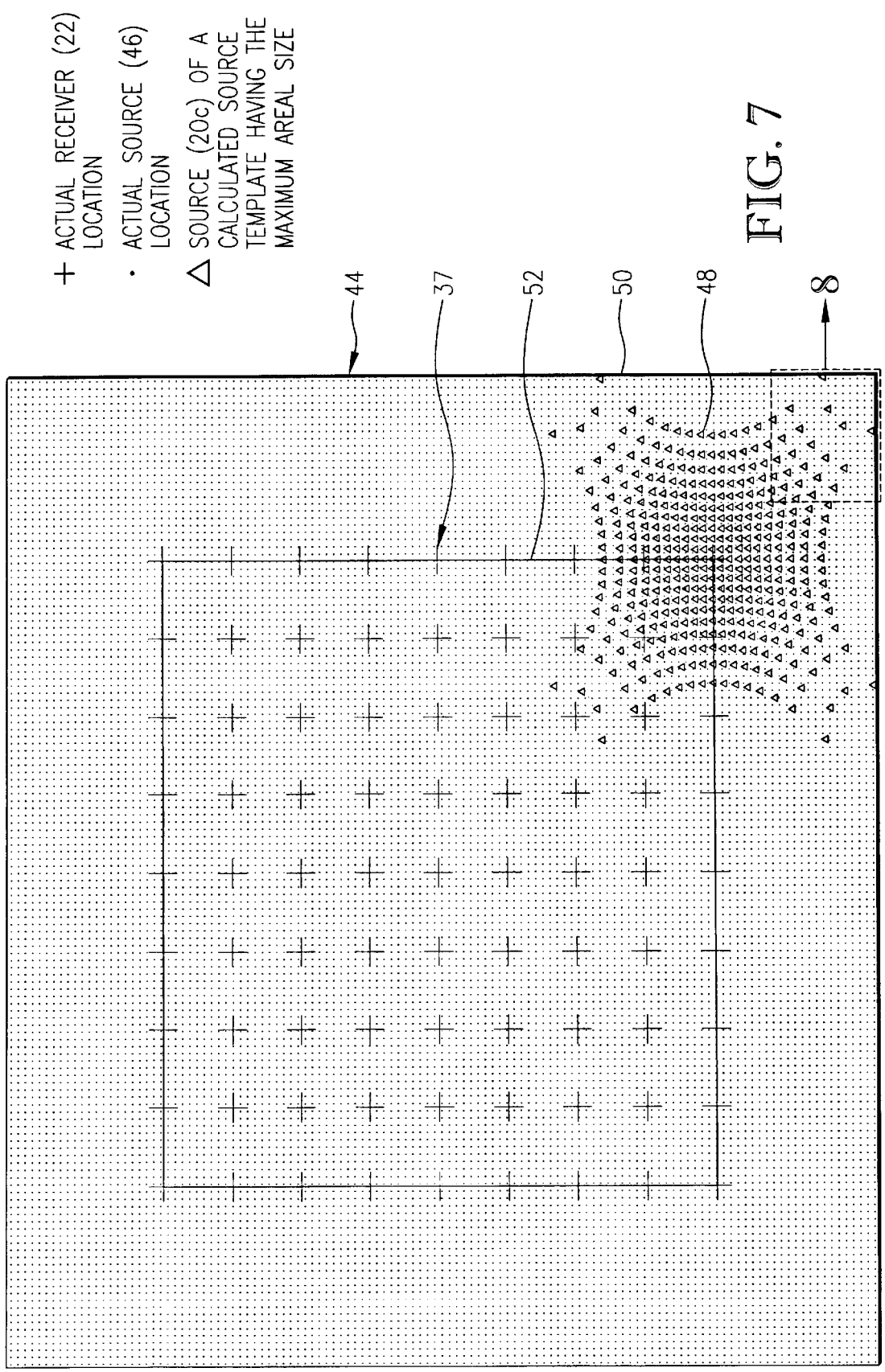
FIG. 7 is a plan view representation of an actual layout of seismic receivers and corresponding actual layout of seismic sources, with the actual source layout having an optimum source density and optimum areal size.

Referring now to FIG. 7, it has been discovered that an optimized actual source layout 44 of actual sources 46 for the given actual receiver layout 37 can be determined based on the density and areal size of the calculated source templates for receivers 22 at various depths and Vp/Vs ratios of interest. Such optimized seismic survey design method is summarized in steps 100–112 in FIG. 9. In step 100, an actual layout of seismic receivers and associated reflection points is defined. The number and arrangement of receivers and reflection points are dictated by a variety of geophysical and logistical requirements. Typically, the configuration of the receivers and reflection points are determined based primarily upon the geophysical requirements of spatial resolution (bin size), fold, azimuth, and offset. The geometry of the receivers can be selected from any of a plurality of suitable receiver geometries known in the art of 3-D seismic surveys. Preferably, the actual layout of receivers is a generally rectangular grid of the receivers having a density of the receivers required to provide a desired fold of data. Preferably, the reflection points have a density sufficient to provide a desired spatial resolution. In step 102, a range of depths of the desired illuminated subsurface based on the given location of receivers and associated reflection points is selected. In step 104, a range of Vp/Vs ratios of the desired illuminated subsurface is selected. In step 106, a mapping function operable to generate calculated source templates is selected. As discussed earlier, the mapping function can be selected from any of a variety of mapping functions. Preferably, the mapping function is a third order C-wave mapping function. In step 108, the mapping function is employed to generate a plurality of calculated source templates at various incremental depths and incremental Vp/Vs ratios within the selected ranges of depths and Vp/Vs ratios.

In step 110, a maximum source density and maximum source areal size is determined from a scan of the plurality of calculated source templates. In step 112, an actual layout of sources is defined based on the maximum density and maximum areal size of the calculated templates. Preferably, the actual layout of sources is a generally rectangular grid of the sources of sufficient density and offset to ensure all the mappings/traces can be interpolated without alias and all fall within the source pool.

Referring again to FIG. 7, the density of actual sources (i.e., "shot points") 46 of actual source layout 44 should be at least as dense as the sources in the most dense calculated source template (i.e., the calculated source template having a minimum spacing between sources 20c). Preferably, the density of sources 46 in actual source layout 44 is within 20 percent of the maximum density of sources 20c in the plurality of calculated source templates. The areal size of actual source layout 44 is determined based on the maximum areal size of the calculated source templates. FIG. 7 shows a calculated source template 48 having the maximum areal size centered on the lower right receiver 22 of actual receiver layout 37. The outermost actual sources 46c of actual source layout 44 define an outer source perimeter 50 of actual source layout 44, while the outermost receivers 22 of actual receiver layout 37 define an outer receiver perimeter 52 of actual receiver layout 37. The amount of space between outer receiver perimeter 52 and outer source perimeter 50 must be sufficiently large to allow actual source 46 coverage for the outermost calculated sources 20c of the calculated source template 48 having the maximum areal size. Thus, the amount of space between receiver perimeter 52 and source perimeter 50 is proportional to the maximum areal size of the plurality of calculated templates. A "maximum offset distance" can be determined from the calculated source template 48 having the maximum areal size. The offset distance of a calculated source template is the distance measured between an outermost corner source 20c of the calculated template and the receiver 22 used to calculate the calculated source template. Preferably, the "perimeter spacing distance" measured between the outermost corner perimeter receiver 22 of actual receiver layout 42 and the corresponding outermost corner perimeter source 46 of actual source layout 44 is at least as great as the maximum offset distance of the calculated template 48 having the maximum areal size. Preferably, the perimeter spacing distance is within about 20 percent of the maximum offset distance of the calculated template 48 having the maximum areal size.

Figure 8:
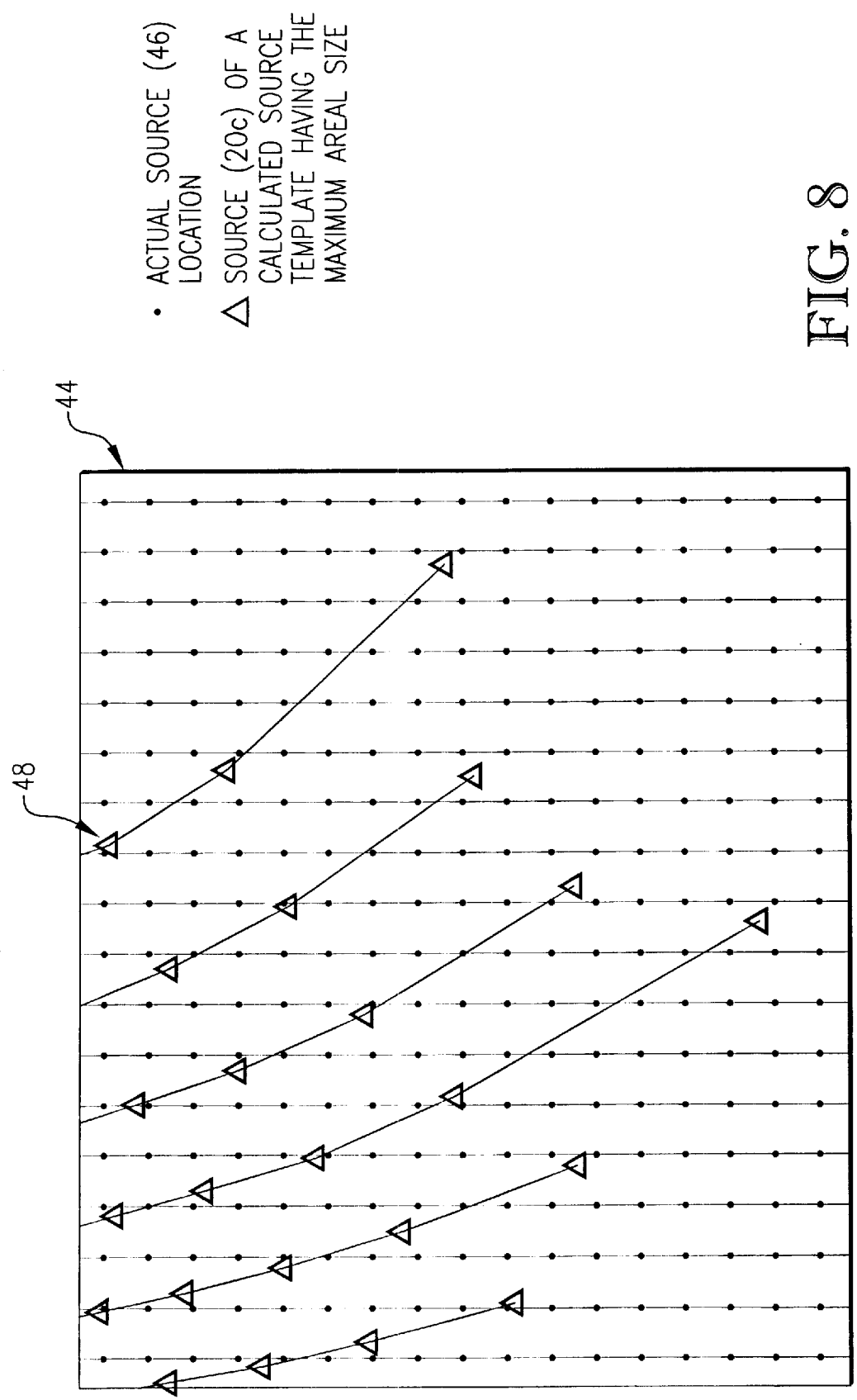
FIG. 8 is an enlarged view of a corner portion of FIG. 7, particularly illustrating the relationship between the seismic sources in the actual seismic source layout and the seismic sources of a calculated source template for the corner receiver.

Referring now to FIG. 8, it can be seen that the sources 46 of actual source layout 44 are denser than sources 20c of the calculated source template 48 having the maximum areal size. However, an actual seismic source 46 is not always positioned in the exact location as every seismic source 20c of the calculated source template. Thus, interpolation will be required during processing of the seismic traces to estimate the calculated source 20c location from the nearest actual source 46 location(s). Such interpolation can be performed in any manner known in the art.

Referring now to FIG. 10, although one embodiment of the invention has been described in detail with reference to designing an actual layout of seismic sources based on a given layout of seismic receivers, it should be understood that the present invention is fully applicable in the inverse situation where it is desired to calculate an actual layout of seismic receivers based on a given layout of seismic sources. Such optimized seismic survey design method is summarized in steps 200–212 shown in FIG. 10. Steps 200–212 are performed in substantially the same manner as step 100–112 of FIG. 9.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the doctrine of equivalents to determine and assess the reasonably fair scope of the present invention as pertains to any apparatus not materially departing from but outside the literal scope of the invention as set forth in the following claims.

What is claimed is:

1. A seismic survey design method for determining an actual layout of first seismic components that cooperates with a given layout of second seismic components to provide a desired subsurface illumination, said method comprising the steps of:
   (a) selecting a mapping function that is operable to generate a calculated template of the first components for each of the second components at various subsurface depths and Vp/Vs ratios of interest;
   (b) using the mapping function to determine a critical density and a critical areal size of the first components based on a plurality of the calculated templates; and
   (c) defining the actual layout of first components based on the critical density and the critical areal size.

2. A method according to claim 1,
step (b) including selecting the critical density and critical areal size based on a comparison of the density and areal size of the calculated templates generated at various subsurface depths and Vp/Vs ratios.

3. A method according to claim 2,
said critical density being determined from a first one of the calculated templates,
said first one of the calculated templates having a maximum density of all the calculated templates.

4. A method according to claim 3,
said actual layout of first components having an average density that is at least as great as the critical density.

5. A method according to claim 4,
said critical areal size being determined from a second one of the calculated templates,
said second one of the calculated templates having a maximum areal size of all the calculated templates.

6. A method according to claim 5,
said actual layout of first components including a first perimeter of the first components,
said given layout of second components including a second perimeter of the second components,
said first perimeter and said second perimeter defining a perimeter space therebetween,
said perimeter space having a size that is proportional to the critical areal size.

7. A method according to claim 6,
said second one of the calculated templates defining a critical offset distance between a calculated outermost first component of the second one of the calculated templates and the second component used to generate the second one of the calculated templates,
said first perimeter including an actual outermost first component and said second perimeter including a corresponding actual outermost second component,
said actual outermost first and second components of the first and second perimeters being spaced from one another by a distance that is at least as great as the critical offset distance.

8. A method according to claim 7,
said first and second perimeters being generally rectangular in shape,
said first and second perimeters being substantially centered on a common center point,
said actual outermost first and second components of the first and second perimeters being located on corresponding corners of the first and second perimeters.

9. A method according to claim 8,
said first components being seismic sources,
said second components being seismic receivers.

10. A method according to claim 1,
each of said calculated templates being an estimation of an ideal first component template that provides an ideal subsurface illumination for a given one of the second components, at a given subsurface depth, and a given Vp/Vs ratio.

11. A method according to claim 1,
said mapping function being suitable for estimating the travel path of converted waves from a surface seismic source to a surface seismic receiver through a subsurface formation.

12. A method according to claim 1,
said calculated templates being generally non-rectangular grids of the first components,
said actual layout being a generally rectangular grid of the first components.

13. A method according to claim 1,
said first components being seismic signal sources,
said second components being seismic signal receivers.

14. A method according to claim 13,
said critical density being a maximum calculated source density for the depths and Vp/Vs ratios of interest,
said critical areal size being a maximum calculated source areal size for the depths and Vp/Vs ratios of interest.

15. A method according to claim 8,
said first components being seismic receivers,
said second components being seismic sources.

16. A method according to claim 1,
said first components being seismic signal receivers,
said second components being seismic signal sources.

17. A method according to claim 16,
said critical density being a maximum calculated receiver density for the depths and Vp/Vs ratios of interest,
said critical areal size being a maximum calculated receiver areal size for the depths and Vp/Vs ratios of interest.

18. A seismic survey design method for determining an actual source layout of seismic sources that cooperate with a given receiver layout of seismic receivers to provide a desired subsurface illumination, each of said seismic receivers having a subsurface collection of common conversion points associated therewith, said method comprising the steps of:
   (a) using a mapping function to generate a first calculated source template having a maximum source density;
   (b) using the mapping function to generate a second calculated source template having a maximum source areal size; and
   (c) defining the actual source layout based on the maximum source density and the maximum source areal size.

19. A method according to claim 18,
said mapping function being operable to estimate the travel path of converted waves from the seismic sources to the seismic receivers through a subsurface formation.

20. A method according to claim 18,
said mapping function being selected from the group consisting of a compression wave mapping function, a first order converted wave mapping function, and third order converted wave mapping function.

21. A method according to claim 18,
said mapping function being a converted wave mapping function yielding calculated source templates that are generally in the form of non-rectangular grids of the sources.

22. A method according to claim 18,
said mapping function being characterized by the following formula:

$$X = \frac{(1-C_0) - \sqrt{(1-C_0)^2 - (4*C_3*A^2/Z^2)}}{(2*A*C_3/Z^2)}$$

wherein g=Vp/Vs,
$C_0$=g/(1+g),
$C_2$=0.5*g(g−1)/((g+1)$^3$),
$C_3$=$C_2$/(1−$C_0$), and
wherein Vp is compression wave velocity, Vs is shear wave velocity, X is the distance between one source and one receiver for a given one of the common conversion points, and Z is the depth of the given common conversion point.

23. A method according to claim 18, further comprising the step of:
(d) prior to step (a), selecting a mapping function that is operable to generate a calculated source template for each of the receivers and associated subsurface collection of common conversion points at various subsurface depths and Vp/Vs ratios of interest.

24. A method according to claim 23,
said calculated source template being a generally non-rectangular grid of the sources,
said actual source layout being a generally rectangular grid of the sources.

25. A method according to claim 23,
steps (a) and (b) including scanning a plurality of the calculated source templates generated for a plurality of the subsurface depths and a plurality of the Vp/Vs ratios.

26. A method according to claim 25,
steps (a) and (b) including scanning a plurality of the calculated source templates generated for a plurality of the receivers.

27. A method according to claim 26,
step (a) including selecting the first calculated source template from the plurality of calculated source templates based on a minimum spacing between the sources of the calculated source templates,
step (b) including selecting the second calculated source template from the plurality of calculated source templates based on a maximum offset distance between the receiver used in generating the calculated source template and an outermost one the sources of the calculated source template.

28. A method according to claim 18,
said actual source layout having a density of the sources that is at least as great as the maximum source density.

29. A method according to claim 28,
said actual source layout including an outer source perimeter of the sources,
said given receiver layout including an outer receiver perimeter of the receivers,
said outer source perimeter and said outer receiver perimeter defining a perimeter space therebetween,
said perimeter space having a size that is proportional to the maximum source areal size.

30. A method according to claim 29,
said second calculated source template defining a maximum offset distance between the receiver used in determining the second calculated source template and an outermost one of the sources of the second calculated source template,
said outer source perimeter including an outermost source and said outer receiver perimeter including a corresponding outermost receiver,
said outermost source and receiver being space from one another by a perimeter spacing distance which is at least as great as the maximum offset distance.

31. A method according to claim 30,
said outer source and receiver perimeters being generally rectangular in shape,
said outer source and receiver perimeters being substantially centered on a common center point,
said outermost source and said outermost receiver being located on corresponding corners of the outer source perimeter and outer receiver perimeter.

32. A method according to claim 31,
said actual source layout having a density of the sources that is within about 20 percent of the maximum source density,
said perimeter spacing distance being within about 20 percent of the maximum offset distance.

33. A method of conducting a seismic survey, said method comprising the steps of:
(a) defining an actual layout of first seismic components;
(b) defining an actual layout of second seismic components by selecting a critical density and a critical areal size for the actual layout of second seismic components based on a plurality of calculated templates of the second seismic components, said calculated templates being generated using a mapping function operable to generate a calculated template for each of the first seismic components at various subsurface depths and Vp/Vs ratios of interest, one of said first and second seismic components being a seismic signal source and the other of said first and second seismic components being a seismic signal receiver; and
(c) collecting seismic traces for the seismic signal sources with the seismic signal receivers, said collecting being performed while the sources and receivers are positioned substantially in accordance with the layouts defined in steps (a) and (b).

34. A method according to claim 33,
step (a) including determining a desired subsurface illumination, a desired fold of the subsurface illumination, and a desired group of common reflection points for the subsurface illumination.

35. A method according to claim 34,
said mapping function being operable to determine a calculated location of each second seismic component in each calculated template based on a given location of an associated first seismic component, a given location of an associated common reflection point, and a given Vp/Vs ratio.

36. A method according to claim 33, step (c) including imparting seismic waves into a subterranean formation from at least one of the seismic signal sources and recording reflected seismic waves with at least one of the seismic signal receivers.

37. A method according to claim 36, said reflected seismic waves being converted waves.

38. A method according to claim 37, said actual layout of first seismic components being a generally rectangular grid of the first seismic components, said actual layout of second seismic components being a generally rectangular grid of the second seismic components.

39. A method according to claim 38, said calculate templates being generally non-rectangular grids of the second seismic source.

40. A method according to claim 33, said first seismic component being the seismic signal receiver, said second seismic component being the seismic signal source.

41. A method according to claim 40, said critical density being a maximum calculated density of the seismic signal sources for the subsurface depths and Vp/Vs ratios of interest, said areal size being a maximum calculated areal size of the seismic signal sources for the subsurface depths and Vp/Vs ratios of interest.

42. A method according to claim 33, said first seismic component being the seismic signal source, said second seismic component being the seismic signal receiver.

43. A method according to claim 42, said critical density being a maximum calculated density of the seismic signal receivers for the subsurface depths and Vp/Vs ratios of interest, said critical areal size being a maximum calculated areal size of the seismic signal receivers for the subsurface depths and Vp/Vs ratios of interest.

* * * * *

UNITED STATES PATENT AND TRADEMARK OFFICE
CERTIFICATE OF CORRECTION

PATENT NO. : 6,665,618 B1
DATED : December 16, 2003
INVENTOR(S) : James W. Thomas et al.

It is certified that error appears in the above-identified patent and that said Letters Patent is hereby corrected as shown below:

Column 7,
Lines 23 and 24, delete "a critical" and insert -- an optimal -- therefor.
Lines 27 and 29, delete "critical", both occurrences, and insert therefor -- optimal --.
Lines 34, 40, 42, 56 and 59, delete "critical" and insert therefor -- optimal -- therefor.
Line 38, delete "3" and insert therefor -- 1 --.
Line 41, delete "4" and insert therefor -- 1 --.
Line 46, delete "5" and insert therefor -- 1 --.

Column 8,
Lines 2 and 50, delete "critical" and insert therefor -- optimal --.
Line 12, delete "8" and insert therefor -- 1 --.
Lines 36, 38 and 48, delete "critical" and insert -- optimal -- therefor.
Line 47, delete "16" and insert therefor -- 1 --.

Column 9,
Line 45, delete "23" and insert therefor -- 18 --.
Line 50, delete "25" and insert -- 18 -- therefor .

Column 10,
Line 1, delete "28" and insert therefor -- 18 --.
Line 43, delete "critical", both occurrences, and insert -- optimal --.
Line 64, delete "34" and insert -- 33 -- therefor.

Column 11,
Line 11, delete "37" and insert -- 33 -- therefor.
Line 19, delete "38" and insert -- 33 -- therefor.

Column 12,
Line 3, delete "40" and insert -- 33 -- therefor.
Line 4, delete "critical" and insert -- optimal -- therefor.
Line 16, delete "42" and insert therefor -- 33 --.
Line 17, delete "critical" and insert therefor -- optimal --.

UNITED STATES PATENT AND TRADEMARK OFFICE
CERTIFICATE OF CORRECTION

PATENT NO. : 6,665,618 B1
DATED : December 16, 2003
INVENTOR(S) : James W. Thomas et al.

It is certified that error appears in the above-identified patent and that said Letters Patent is hereby corrected as shown below:

<u>Column 12 (cont'd),</u>
Line 20, delete "critical" and insert --optimal -- therefor.

Signed and Sealed this

First Day of June, 2004

JON W. DUDAS
*Acting Director of the United States Patent and Trademark Office*